April 9, 1929.  J. W. HENRY  1,708,421

PLASTIC MOLDING DEVICE

Filed Dec. 15, 1927

John W. Henry, Inventor

J. A. Sperry, Attorney

Patented Apr. 9, 1929.

1,708,421

UNITED STATES PATENT OFFICE.

JOHN W. HENRY, OF CRAWFORDSVILLE, INDIANA.

PLASTIC MOLDING DEVICE.

Application filed December 15, 1927. Serial No. 240,289.

My invention relates to plastic molding devices in general, and more directly to molding machines for the manufacture of concrete blocks, bricks or tile having medial cores or ducts, and has for one principal object the molding of such blocks by the use of compressed air applied through said cores or ducts. A further object is to mold such blocks quickly and efficiently by compressing the concrete outwardly from said cores or ducts. A further object is to provide means for quickly and easily filling the molds around and between the cores before compressing it in the mold. Another object is to rigidly secure the compressing element at its end, and to provide means for readily interchanging said elements when desired. A further object is to provide means for quickly removing the compressing element from the mold, and to maintain the compression device in definite formation both within and without the mold.

Figure 1:
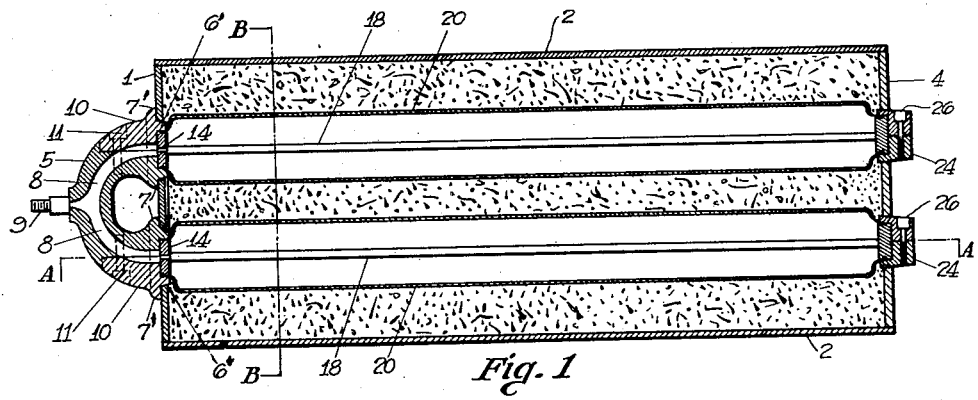
Figures 2, 4, 5:
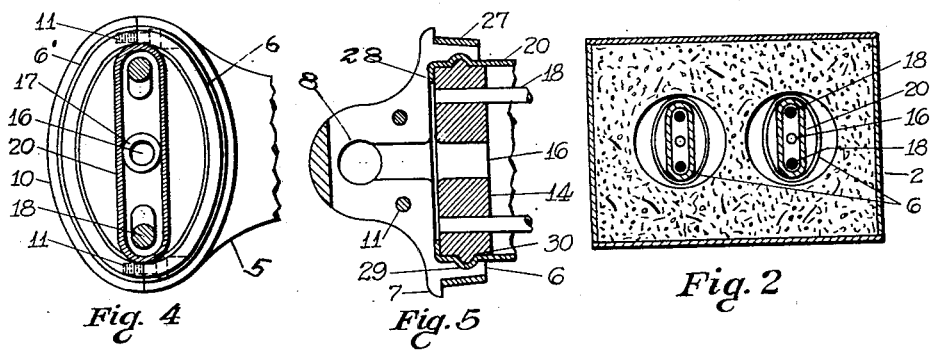
Figure 3:
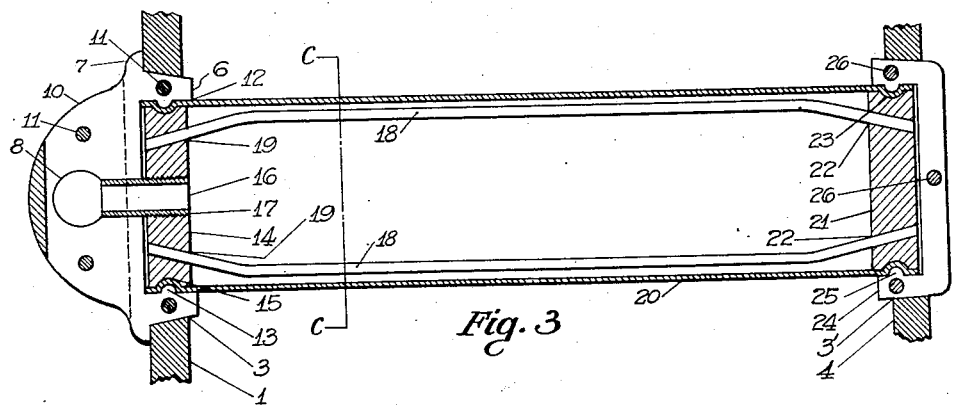

With these and other objects in view, my invention consists essentially of the mechanism and arrangements designated in the accompanying drawings, showing a preferred form of the device, and in which like numerals refer to like parts throughout, and in which Figure 1 illustrates a general plan view in horizontal section through a mold with the device in operative position: Figure 2 is an end elevation in section on line B—B of Fig. 1; Figure 3 is a side elevation of the device in section on line A—A of Fig. 1; Figure 4 is an end elevation on line C—C of Fig. 3; and Figure 5 is an alternative arrangement of the clamping device shown in Fig. 3.

With further reference to the drawings, the numerals 1 and 4 designate the end plates of the mold, and 2 shows the side walls thereto. The end plates 1 and 4 have a plurality of aligned openings 3 and 3' therethrough, to register with a plurality of shaped arcuate projections 6—6 integrally formed on a head member 5, said member 5 being provided with a plurality of air ducts 8 leading to the various core forming tubes, and receiving air under pressure from an intake opening 9. The head 5 is provided with abutments 7 to engage the end plate 1, and is fitted at each outlet with a clamping member 10 secured thereto by screws 11, the member 10 being provided with abutments 7' and arcuate projections 6' to align with and supplement abutments 7 and projections 6 on the head 5, the projections 6 and 6' forming a closed arcuate recess 12 at each outlet of head 5. The recess 12 is provided with an annular projection 13 registering with a similar or corresponding groove 15 in the periphery of an end plate 14 positioned within the recess 12, plate 14 having an opening 16 to align with duct 8 and may be secured to head 5 by a nipple or tube 17 if desired. A similar plate 21, having an annular groove 23, is opposed to plate 14 within opening 3' in end 4, and is attached thereto and rigidly spaced therefrom by a plurality of rods 18 fixedly secured to plate 14, as at 19, and to plate 21, as at 22. A split, or two piece, clamping head 24, with an annular projection 25 to register with groove 23, is shaped to fit opening 3', the two parts of the head being conjoined as by screws 26. Surrounding rods 18 and plates 14 and 21, a rectilinear section of flexible and expansible tubing 20 is fixedly secured upon said plates 14 and 21 by the clamping head 24 and the members 8 and 10 through the instrumentality of the annular grooves 15 and 23 and the projections 13 and 25. As an alternative construction, the relation of the grooves and projections may be reversed, as at 29 and 30, and the end of tube 20 may be further clamped, as at 28, if desired, while the clamping members 5 and 8, or the split head 24 may be maintained in clamped position as by a band 27 forced thereon.

In practice, it is found that the plurality of rods 18 retain the head members in definite and fixed position much more securely than will a single rod, and makes a better closure for the openings in the end plates of the mold, besides being faster to operate. They also retain the flexible tube in a vertically oval cross-section when deflated, thus providing a wider space between the tubes, and between the tubes and the sides of the mold, making it easier and quicker to fill and tamp the mold and to force the concrete beneath the tubes, than when a single rod is employed. The split, or two piece, clamping heads secure the flexible tube much more firmly upon the end plates 14 and 21, and make it quicker and easier to replace or repair a tube than when solid clamping devices are employed. In using the device in practice, it is requisite to merely position the device in the openings in the ends of the mold box, fill the mold with the necessary amount of concrete, inflate the tubes with air from any available source, deflate the tubes when ready, withdraw them longitudinally from the mold, and remove the block from the mold when sufficiently set or hardened.

Having thus described my invention, what I claim as new, and desire to protect by these Letters Patent is:—

1. In a concrete block forming machine having a mold box thereon, a plurality of openings in opposite ends of said box, a plurality of core forming units insertable through said openings, said units being interconnected by a common head, air ducts within said head radiating from a common intake and registering with said core forming units, a plurality of removable clamping segments to secure said core forming members upon said common head, end plates positioned within said core forming units having indentures to position said plates within said head and said clamping segments, and plural means for maintaining said end plates in fixed parallelism and said core forming members, in determined conformation while in deflated condition within or without said mold box.

2. An expansible core forming unit for a plastic block forming machine, consisting of a rectilinear section of expansible and flexible tubing, an end plate in each end of said tubing, an annular recess around each of said end plates, a split clamping head surrounding each of said end plates, an annular projection on each of said heads to register with the annular recess in said end plates, means for clamping said heads upon said tubing and said end plates, an air duct through one of said heads and said end plate adjacent thereto, and means for inflating and deflating said tubing through said air duct.

3. An expansible core forming member for a block forming machine, said member consisting of a plurality of flexible and expansible tubing sections, plates within the ends of said sections to essentially close said ends, a two piece clamp device surrounding one end of each tubing section, an annular groove on each of said end plates, an annular projection on each of said clamp devices exteriorly of said tubing to engage its corresponding groove, means for compressing said clamp devices fixedly upon their corresponding end plates, said clamp devices forming closures for the openings which position one end of said core forming members within the mold box of a block making machine, a common head member joining the remaining ends of said tubing sections, divergent air ducts from a common intake through said head member to each tubing section, a plurality of arcuate projections integral with said head member, a plurality of arcuate clamping sections to cooperate with said arcuate projections to rigidly secure an end of said tubing section upon its end plate, said clamping sections and said projections having an internal annular rib to align with and fit into the recess in their inclosed end plates, a plurality of parallel rods within each tubing section fixedly attached to each end plate within said tubing section to maintain said end plates in essential parallelism and in spaced relation to each other and to said head member, essentially as described.

4. In a core forming device for a block making machine, said device having a section of expansible tubing, a plate within each end of said tubing, an annular groove circumferentially on each plate, a plurality of rods conjoining said plates, said rods positioned to maintain said plates in essential parallelism and to retain said tubing in a flattened or elliptical cross-section when said tubes are deflated, a two piece clamping member compressing said tubing upon one of said grooved plates, a tongue on said clamping members compressing said tubing within the groove in the end plate, an air intake head having a recessed projection to surround one half of the remaining end of said tube, a plate removably attached to said head having a similar recessed projection to surround the remaining half of said tube end, the head and its attached plate having an annular projection to register with the groove in the enclosed end plate, an annular band surrounding said projections to maintain them in conjoined position, means to admit fluid pressure to said tube through said head and release said fluid pressure from said tube, said head and its attached plate forming a closure for an opening in a mold box, and said two piece clamping member forming a closure for an opening in the opposite end of the mold box of said block making machine, essentially as and for the purpose described.

In witness whereof, I have hereunto set my hand November, 1927.

JOHN W. HENRY.